Feb. 9, 1971 W. C. KULAS 3,562,659
WIDE BAND TRANSISTOR AMPLIFIERS WITH REDUCTION IN NUMBER OF AMPLIFYING STAGES AT HIGHER FREQUENCIES
Filed Nov. 29, 1968 6 Sheets-Sheet 1

INVENTOR.
WILLIAM C. KULAS
BY
Wolf, Greenfield & Hieken

INVENTOR
WILLIAM C. KULAS
BY
Wolf, Greenfield & Hieken
ATTORNEYS

INVENTOR
WILLIAM C. KULAS
BY Wolf, Greenfield & Hieken
ATTORNEYS

INVENTOR
WILLIAM C. KULAS
BY
Wolf, Greenfield & Hieken
ATTORNEYS

INVENTOR
WILLIAM C. KULAS
BY Wolf, Greenfield & Hieken
ATTORNEYS

United States Patent Office 3,562,659
Patented Feb. 9, 1971

3,562,659

WIDE BAND TRANSISTOR AMPLIFIERS WITH REDUCTION IN NUMBER OF AMPLIFYING STAGES AT HIGHER FREQUENCIES

William C. Kulas, Woburn, Mass., assignor to Krohn-Hite Corporation, Cambridge, Mass.

Filed Nov. 29, 1968, Ser. No. 779,771
Int. Cl. H03f *1/08, 3/04*
U.S. Cl. 330—21 11 Claims

ABSTRACT OF THE DISCLOSURE

A wide band relatively high power low distortion stable signal generator is operative over the frequency range 10 Hz. to 10 mHz. The system includes a number of amplifying stages that provide multiple stage amplification at low frequencies and single stage amplification effectively at the higher frequencies to help prevent undesired oscillation. Nonlinear feedback techniques are employed to maintain AVC stability. Feedback from the output stage is derived so that the output stage emitter resistors form a portion of the 50 ohm output impedance. A novel ladder attenuating network provides precision attenuation while presenting the same 50 ohm impedance at all attenuation levels over the frequency range.

BACKGROUND OF THE INVENTION

The present invention relates in general to signal generating and more particularly concerns a novel test oscillator and novel components of the system characterized by operation over an exceptionally wide range of frequencies, relatively high power output, exceptionally flat frequency response, exceptionally low harmonic distortion, exceptionally low amplitude stability, high frequency accuracy, substantially constant internal impedance while performing with a high degree of reliability and being embodied in a relatively compact relatively low cost package.

It is an object of the invention to provide a relatively low cost signal source with performance heretofore available only in units selling at a much higher price.

It is a further object of the invention to achieve the preceding object while providing a pure sine wave over almost the full audio frequency range and a considerable portion of the radio frequency range at relatively high power levels and exceptionally low distortion while providing rapid and continuous frequency tuning to relatively high degree of accuracy.

It is a further object of the invention to achieve one or more of the preceding objects while maintaining an exceptionally flat frequency response to facilitate use of the invention for meter calibration, response measurements and amplifier testing.

It is a further object of the invention to provide stable means for wideband amplification.

It is a further object of the invention to achieve wideband amplification efficiently at high power levels.

It is a further object of the invention to provide a resistive attenuator that is relatively easy and inexpensive to fabricate and provides precision attenuation while continuously providing a constant resistive output impedance at all attenuation settings over an exceptionally wide frequency range.

It is a further object of the invention to achieve one or more of the preceding objects with a compact unit that operates reliably with relatively little attention.

SUMMARY OF THE INVENTION

According to the invention, an oscillator provides a signal of controllable frequency and substantially constant amplitude to an output amplifier that is coupled to an output terminal by means including an output attenuator. An AVC amplifier includes means for maintaining the amplitude of the signal provided by the oscillator substantially constant. Power supply means provides necessary operating potentials.

At least one of the circuits includes at least first and second semiconductor signal amplifying devices for providing amplification over a wide range of frequencies. The first and second signal amplifying devices are intercoupled by means for maintaining the first and second devices in joint amplifying arrangement over a first frequency range below a first frequency and only one of said devices in amplifying relationship above the first frequency while the other of the devices functions as a signal coupling means without amplification to attain a high gain bandwidth product.

According to another feature of the invention, the output amplifying transistor includes an emitter resistor outside the feedback circuit of the amplifying stages which resistor forms part of the impedance seen at the output of the amplifier comprising this transistor to attain broadbanded power capabilities with standard low cost commercially available transistors.

Still another feature of the invention resides in the output attenuator comprising a resistive ladder network defining taps that provide a desired degree of attenuation while presenting a substantially constant output impedance. Preferably, the attenuation is provided in equal decibelic increments with most of the resistors in the ladder network being of substantially the same value to provide high performance with relatively few components.

Numerous other features, objects and advantages of the invention will become apparent from the following specification when read in connection with the accompanying drawing in which:

DETAILED DESCRIPTION OF PREFERRED EMBODIMENTS

Figure 1:
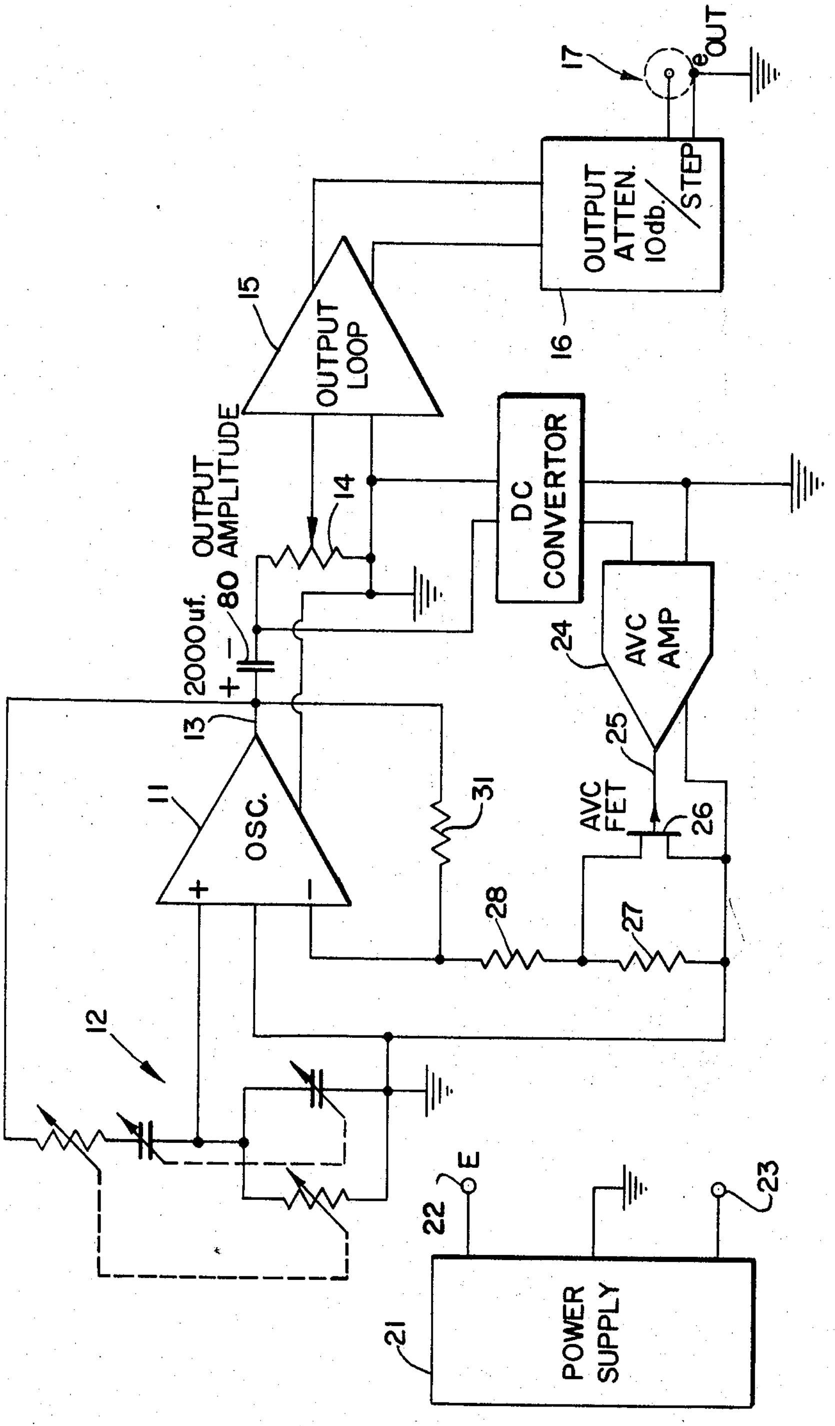
FIG. 1 is a combined block-partial schematic circuit diagram illustrating the logical arrangement of signal generating means according to the invention.

With reference now to the drawing and more particularly FIG. 1 thereof, there is shown a combined block-schematic circuit diagram of a preferred embodiment of the invention. Like reference symbols identify corresponding elements throughout the drawing.

The oscillator 11 has its frequency controlled by the ganged RC circuit 12 to provide at output line 13 a pure sine wave of substantially constant amplitude that is A-C coupled through 2000 $\mu$f. capacitor 80, through output amplitude control potentiometer 14 through output amplifying loop 15 and output attenuator 16 to output coaxial terminal pair 17, typically presenting an output impedance of substantially 50 ohms.

A power supply 21 provides regulated potentials, typically +22 volts on terminal 22 and −22 volts on 23 for use as operating potentials in the system. An AVC amplifier 24 is A-C coupled to output line 13 by the 2000 $\mu$f. capacitor 80, poled as shown, to provide an AVC signal on line 25 that controls the effective shunting resistance provided by AVC FET 26 coacting with resistors 27, 28 and 31 to form a controllable feedback attenuator that maintains the output substantially constant. These circuits are described in greater detail below.

The invention is embodied in the commercially available Krohn-Hite Model 4200 signal source that is operative over the frequency range from 10 Hz. continuously through 10 mHz. An important feature of the present invention and its commercial embodiment is the use of multiple transistor amplifiers in which below a predetermined frequency at least two transistors perform amplification; that is, the gain of the amplifying stage associated with the respective device is greater than one, while above that frequency only one transistor amplification stage provides gain. This is an important feature for maintaining stable performance over the exceptionally wide frequency range of the present invention. Because vanishing gain is used in a number of forms throughout the system, it is appropriate to discuss this aspect of the invention first.

There is electron tube circuitry in the prior art comprising a two-stage electron tube amplifier with a cathode follower output. The input signal is applied to the grid of the first electron tube stage which amplifies signals below a predetermined frequency and then applies the amplified signals to the grid of a second electron tube amplifier stage. A capacitor also couples the input to the grid of the second electron tube amplifier stage so that above the first frequency this capacitor effectively bypasses the first electron tube amplifying stage and only the second electron tube stage provides amplification.

This electron tube technique may not be applied to transistor circuits because of important differences in principles of operation. In the electron tube circuitry of the prior art, the capacitor coupling the input to the grid of the second electron tube amplifier effectively feeds forward to the high impedance presented by the second electron tube amplifier grid. Serious practical problems are presented if one were to attempt to feed forward to the base of a transistor in an analogous circuit because of the low input impedance presented at the base of a transistor makes driving the base directly through a capacitor from a high impedance source difficult.

The capacitive loading of electron tube circuits in the primary bandwidth limiting factor. In transistor amplifiers capacitive loading is usually only important in the output stage where large signal swing is developed. A more important limitation in transistor circuits is the beta cutoff frequency of the transistor. The present invention employs vanishing gain above a predetermined frequency to reduce the effects of beta cutoff frequency limitation of a transistor circuit. To this end the invention typically removes the driving signal for one of the amplification stages from the transistor base to its emitter to improve the bandwidth of that stage by converting the stage from a common emitter stage below the transition frequency to a common base stage above the transition frequency. Since it is the current drive from the first stage to the second stage that is important in conventional transistors, the beta gain afforded by the converted stage is lost. The stage losing gain still functions to provide the full output voltage swing on its collector for the next stage or the output.

Figure 2:
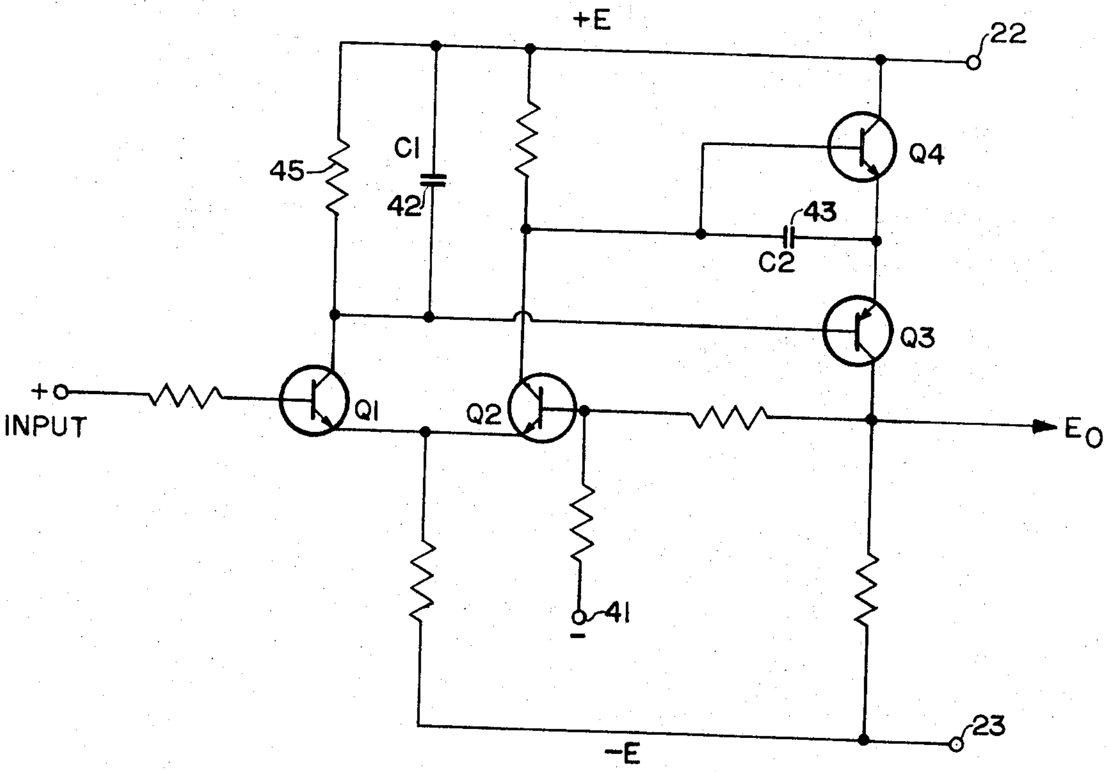
FIG. 2 is a schematic circuit diagram of an amplifier according to the invention having four transistors.

Referring to FIG. 2 there is shown a circuit embodying stage vanishing techniques according to the invention. Transistors Q1, Q2, Q3 and Q4 and associated circuitry comprise a typical two-stage direct-coupled differential amplifier with feedback to the base of transistor Q2 that receives the signal on minus input 41. At low frequencies where the impedance of capacitor 42 of value C1 and capacitor 43 of value C2 is high so that negligible current flows through capacitors 42 and 43, the drive for the output stages Q3 and Q4 is push-pull on their bases in a conventional manner. At higher frequencies, capacitor 42 bypasses collector load resistor 45 of transistor Q1 to effectively kill the base drive of transistor Q3, thereby converting transistor Q3, having its base effectively grounded for signals of this frequency through the low impedance of the power supply, into a grounded or common base stage with the drive coming from the emitter of transistor Q4 into the emitter of transistor Q3. In this condition transistor Q4 is acting as an emitter follower driving the emitter of transistor Q3.

When the frequency rises to a point where capacitor 43 presents a very low impedance, capacitor 43 bypasses the emitter follower stage comprising transistor Q4 to supply drive to the emitter of transistor Q3 directly from the collector of transistor Q2. Then transistors Q2 and Q3 function as a single stage common emitter amplifier with transistor Q3 acting as a shield to prevent feedback from the collector of transistor Q3 to the base of transistor Q2. The effective loop gain and phase shift of the circuit has fallen to that of one stage of gain (instead of two at lower frequencies). In order to maintain full output voltage swing at frequencies where capacitors 42 and 43 present a low impedance, the current capabilities of transistors Q1 and Q2 should be capable of providing the full current swing necessary in transistor Q3. This condition may be met if the operating or quiescent current in transistors Q1 and Q2 is substantially equal to that in transistors Q3 and Q4.

Figure 3:
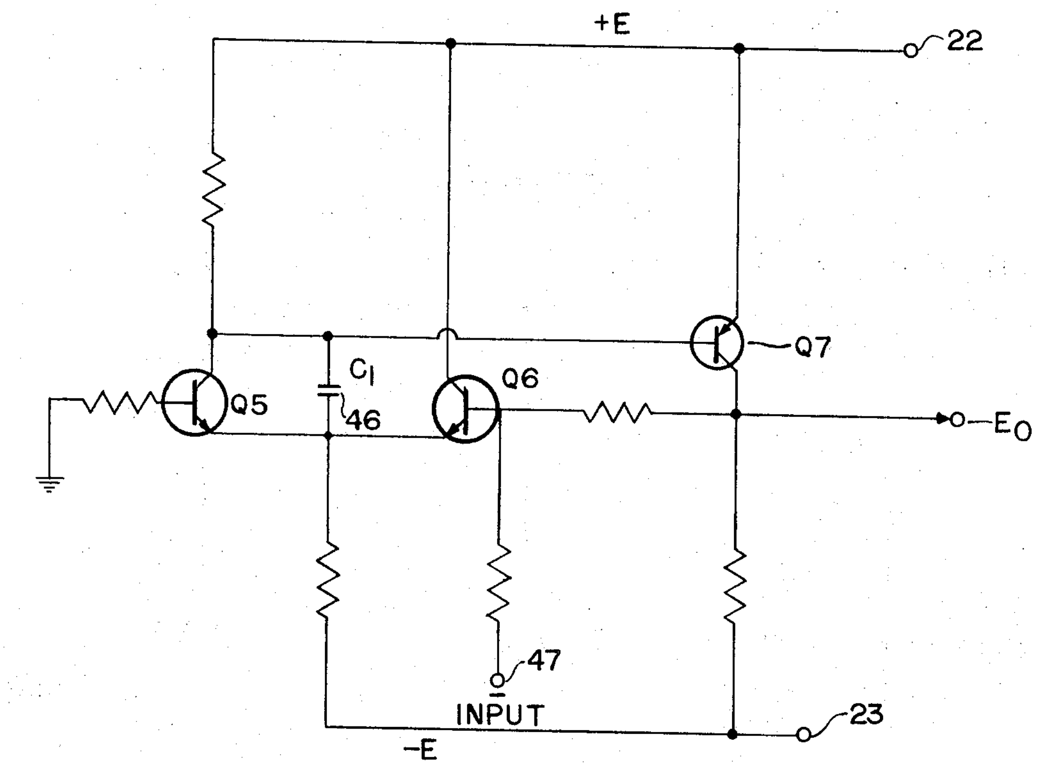
FIG. 3 is a schematic circuit diagram of a three-transistor amplifier according to the invention.

Referring to FIG. 3, there is shown still another embodiment of the invention. Transistors Q5, Q6, Q7 and associated circuit components comprise a two-stage direct coupled feedback amplifier. At frequencies where capacitor 46 presents a high impedance, the loop comprises two stages of gain. The first stage comprises transistors Q5 and Q6 functioning as a differential pair with an input on only terminal 47 to the base of transistor Q6. Transistor Q7 and associated circuitry comprises the output stage and second stage of amplification. The amplified signal on the collector of transistor Q5 drives the base of transistor Q7.

When the impedance presented by capacitor 46 becomes sufficiently small, it effectively bypasses transistor Q5. Then transistor Q6 functions as an emitter follower driving the base of transistor Q7 directly through capacitor 46 to effectively function as an emitter follower driving a common emitter amplifying stage with the loop gain and phase shift becoming that of a single stage of amplification. In this circuit the first stage need only provide the current swing to drive the base of transistor Q7 to obtain full output independently of capacitor 46. Hence, the quiescent current of transistor Q6 need not be as large as that of transistor Q7.

Figure 4:
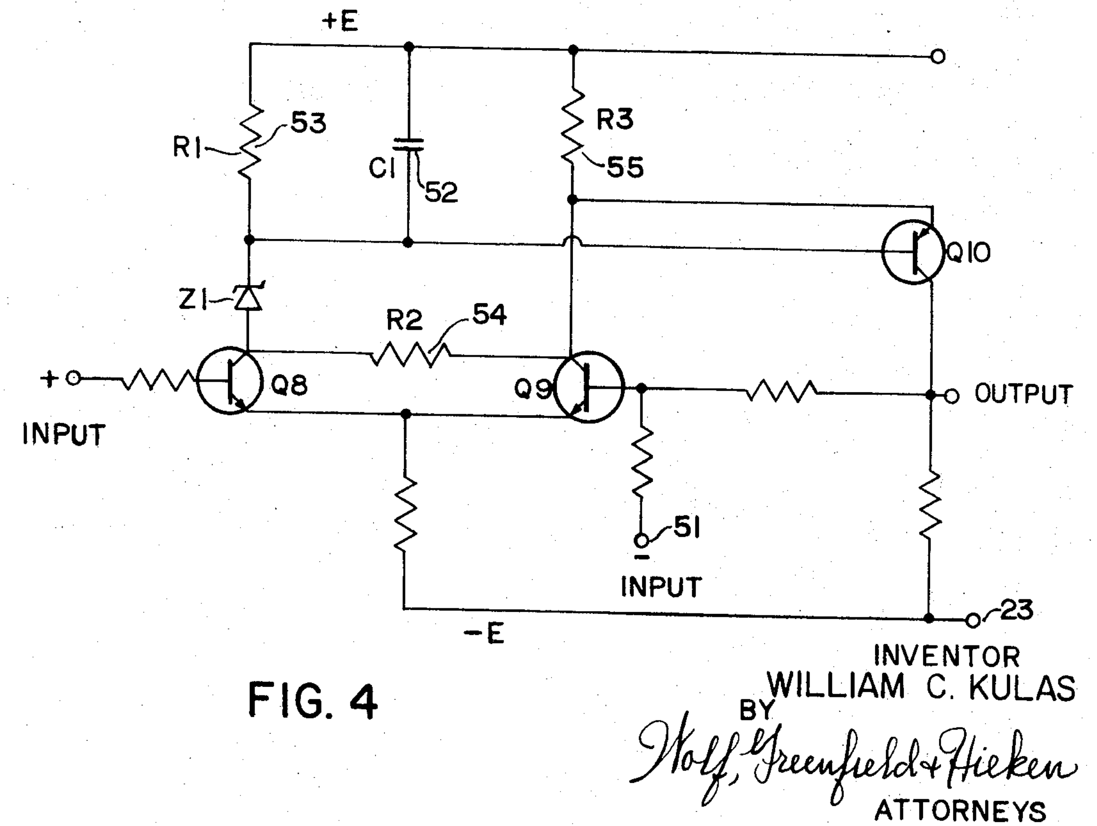
FIG. 4 is a schematic circuit diagram of the two-stage direct-coupled differential amplifier according to the invention with a bootstrapped collector load.

Referring to FIG. 4, there is shown still another arrangement of the invention with high frequency gain vanishing. This circuit is a two-stage direct coupled differential amplifier comprising transistors Q8, Q9, Q10 and associated components with feedback to the base of transistor Q9, the base receiving the signal from minus input terminal 51. The first amplification stage comprises a differential pair, transistors Q8 and Q9, with the collector of transistor Q8 providing the driving signal for the base of transistor Q10 and the collector of transistor Q9 driving the emitter of transistor Q10. This circuit arrangement provides push-pull action across the base-emitter junction of transistor Q10. The drive provided by the collector of transistor Q8 is larger than that provided by the collector of transistor Q9 at frequencies below those where the impedance of capacitor 52 becomes sufficiently low to bypass resistor 53. The drive provided by the collector of transistor Q8 therefore affects the midband gain more than that provided by the collector of transistor Q9.

This circuit provides a bootstrapping action on the collector of transistor Q8 that is better understood by initially ignoring the drive provided by the collector of transistor Q9. This drive does not become significant until the impedance of capacitor 52 becomes sufficiently low to bypass the base drive to transistor Q9. Ignoring initially the effect of resistor 54 of value R2 and Zener diode Z1, the drive voltage developed across resistor 53 of value R1 provides the potential drop across the emitter resistor 55, of value R3, of transistor Q10.

By making the resistance value R1 as large as possible, loop gain is maximized. However, resistor 53 must also provide the quiescent current for transistor Q8. By using Zener diode Z1 and resistor 54 to divert collector current from the collector of transistor Q8 resistor 53 may have a very large value to provide high loop gain while transistor Q8 receives adequate quiescent current. Zener diode Z1 performs the function of providing an offset potential for the base of transistor Q10. Because the emitter of transistor Q10 follows the base drive developed across resistor 53, the resistor 54 of value R2 from the collector of transistor Q8 to the emitter of transistor Q10 carries a constant current determined by the Zener voltage across Zener diode Z1 divided by the resistance value R2. The current in resistor 54 is the quiescent current for transistor Q8 and is substantially constant because the signal on the emitter of transistor Q10 is substantially equal (except for small losses in the base of transistor Q10) to the signal on the collector of transistor Q8, except for the Zener offset voltage. Hence, resistor 54 is a bootstrapped collector load down to D-C. The result is that resistor 53 can be made very large, for it need only provide a current that is sufficiently large to keep Zener diode Z1 operating in its Zener mode and supply base leakage current to transistor Q10.

At frequencies below that where the impedance of capacitor 52 is effective as a bypass, the base drive applied to transistor Q10 is the major drive. In this condition the circuit has two amplifying stages of common emitter gain. When capacitor 52 becomes effective as a bypass, the emitter drive to transistor Q10 becomes more important, and transistor Q10 functions as a common base circuit with gain provided essentially by transistor Q9 and phase shift and loop gain being that of essentially one stage.

To maintain full output voltage swing at frequencies where capacitor 52 is effective as a bypass, the first stage comprising transistors Q8 and Q9 must provide the full current necessary to drive transistor Q10. If the quiescent current in transistors Q8 and Q9 is substantially equal to that in transistor Q10, they provide sufficient drive for transistor Q10.

Because of the large current swings involved in the loops, the wide frequency range and sensitivity of the oscillator, it was found to be important to keep the power supply impedance very low with no peaks over an exceptionally wide range of frequencies while having low ripple and good regulation. Although the source of unregulated potential is conventional, the preferred form of regulator according to the invention helps in providing features discussed above and incorporates the vanishing gain feature.

Figure 5:
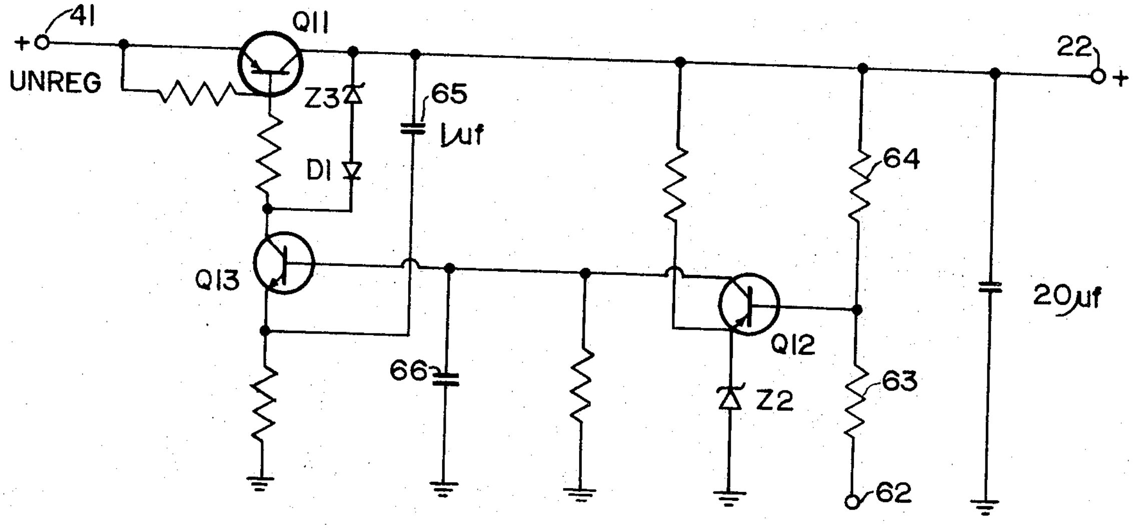
FIG. 5 is a schematic circuit diagram of a preferred form of power supply regulating circuit according to the invention.

Referring to FIG. 5, there is shown a schematic circuit diagram of the preferred form of positive regulator according to the invention for providing a regulated potential of +22 volts. The negative regulator is the same except that PNP and NPN transistors are interchanged, and all diodes are reversed. Accordingly, only the positive regulator is discussed in detail below.

An unregulated D-C potential, typically within the range of 25–35 volts, applied to terminal 41 is dropped to a regulated potential of +22 volts on terminal 22. This regulator comprises a series regulating transistor Q11 and two stages of gain comprising transistors Q12, Q13 and associated circuitry. The first stage comprising transistor Q12 and associated circuitry is connected in a common emitter configuration. The output potential on terminal 22 is summed with a reference potential of opposite polarity on terminal 62 at the junction of dividing resistors 63 and 64 to provide a combined potential on the base of transistor Q12 for comparison with the stable potential on its emitter established by Zener diode Z2. Reference potential terminal 62 may receive the negative reference potential thereon by being directly connected to a Zener diode performing the same function as Zener diode Z2 in the negative regulator circuit just as Zener diode Z2 may provide a positive reference potential for combination with the negative potential to be regulated on terminal 23 by a network analogous to that comprising resistors 63 and 64 in the positive regulator.

Zener diode Z2 performs a dual function. It provides both a stable reference voltage and an offset voltage for the emitter of the first stage transistor Q12. The collector of transistor Q12 feeds the base of the second stage transistor Q13, also connected in common emitter configuration. The collector of transistor Q13 then feeds the base of the series regulating transistor Q11.

Terminal 22 may be short circuited to ground without damaging series regulating transistor Q11. Grounding terminal 22 causes Zener diode Z2 to function as an ordinary diode poled as indicated to cut off transistor Q12 and in turn cut off transistor Q13 which in turn cuts off series regulator transistor Q11.

A starter circuit comprising Zener diode Z3 in series with a diode D1 poled as indicated is connected from the output terminal 22 to the base of series regulating transistor Q11 through a 1K resistor. When output terminal 22 is at zero potential following a short circuit condition or initial turn on of the equipment, starting Zener diode Z3 breaks down and renders transistor Q11 slightly conductive, thereby allowing the potential on output terminal 22 to rise sufficiently to bring Zener diode Z2 back into its regulating mode and force the amplifier stages to coact so as to bring the output potential up to its regulated level. When the output potential on terminal 22 approaches its normal level, starter Zener Z3 no longer functions as a Zener diode to then open the starting path.

It was found important to achieve as high a loop gain bandwidth product as practical. To achieve this, what effectively happens is that the feedback point at higher frequencies is moved from the base of the first stage transistor Q12 to the emitter of the second stage transistor Q13 by capacitor 65 as capacitor 66 functions to bypass the collector of transistor Q12. This stage bypassing results in a reduction of loop gain at these high frequencies while effectively increasing loop bandwidth. The loss of loop gain at these frequencies is not disadvantageous because at these higher output frequencies the power supply 20$\mu$f. output capacitor presents a low impedance to high frequency currents so that the loop handles smaller high frequency signal currents across its eqivalent source impedance. Yet this stage bypassing prevents the source impedance from exhibiting a resonance that would lead to unstable operation.

Figure 6A:
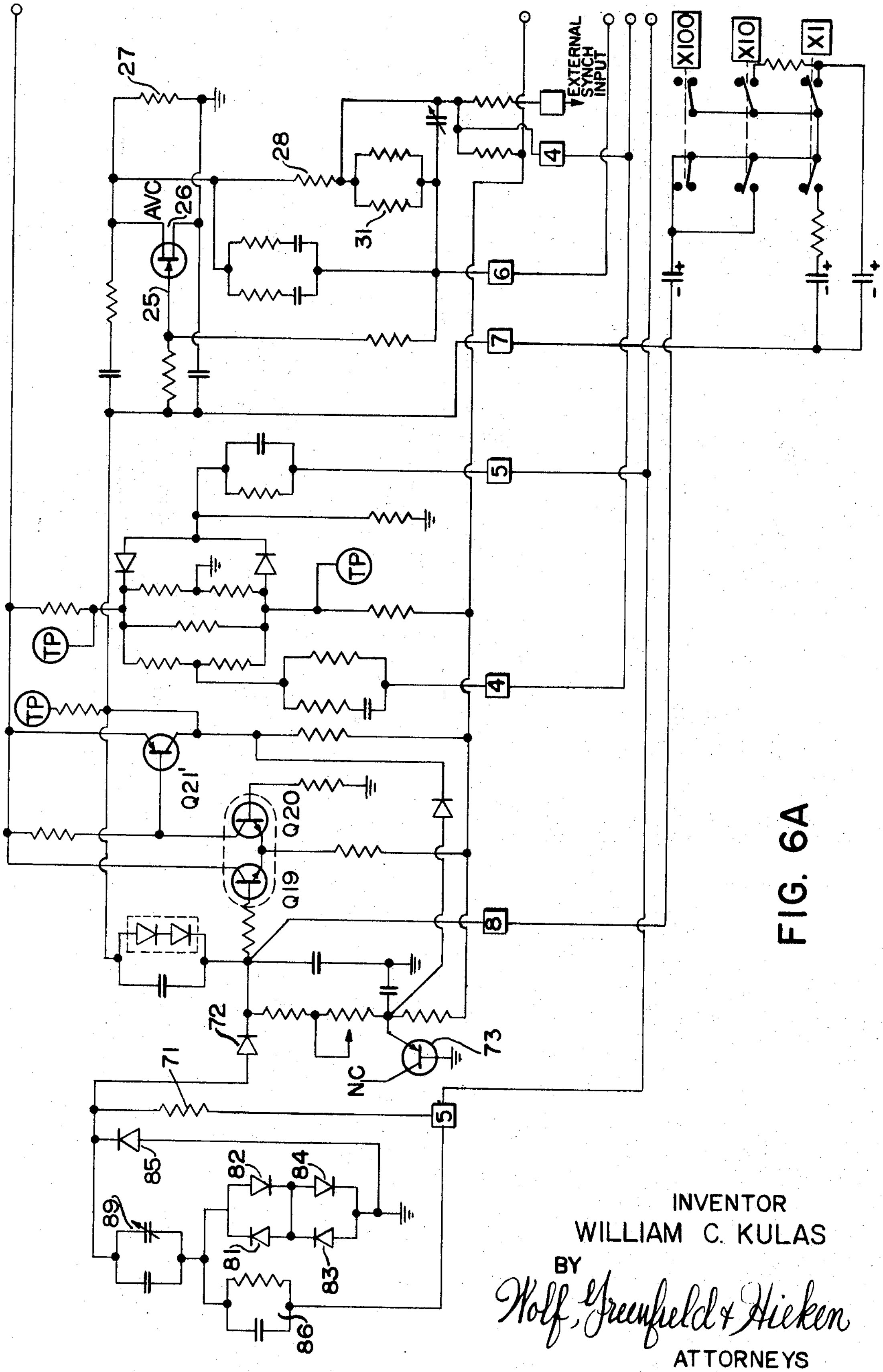
FIG. 6, consisting of FIGS. 6A and 6B, is a schematic circuit diagram of the oscillator AVC and AVC FET in an exemplary embodiment.
Figure 6B:
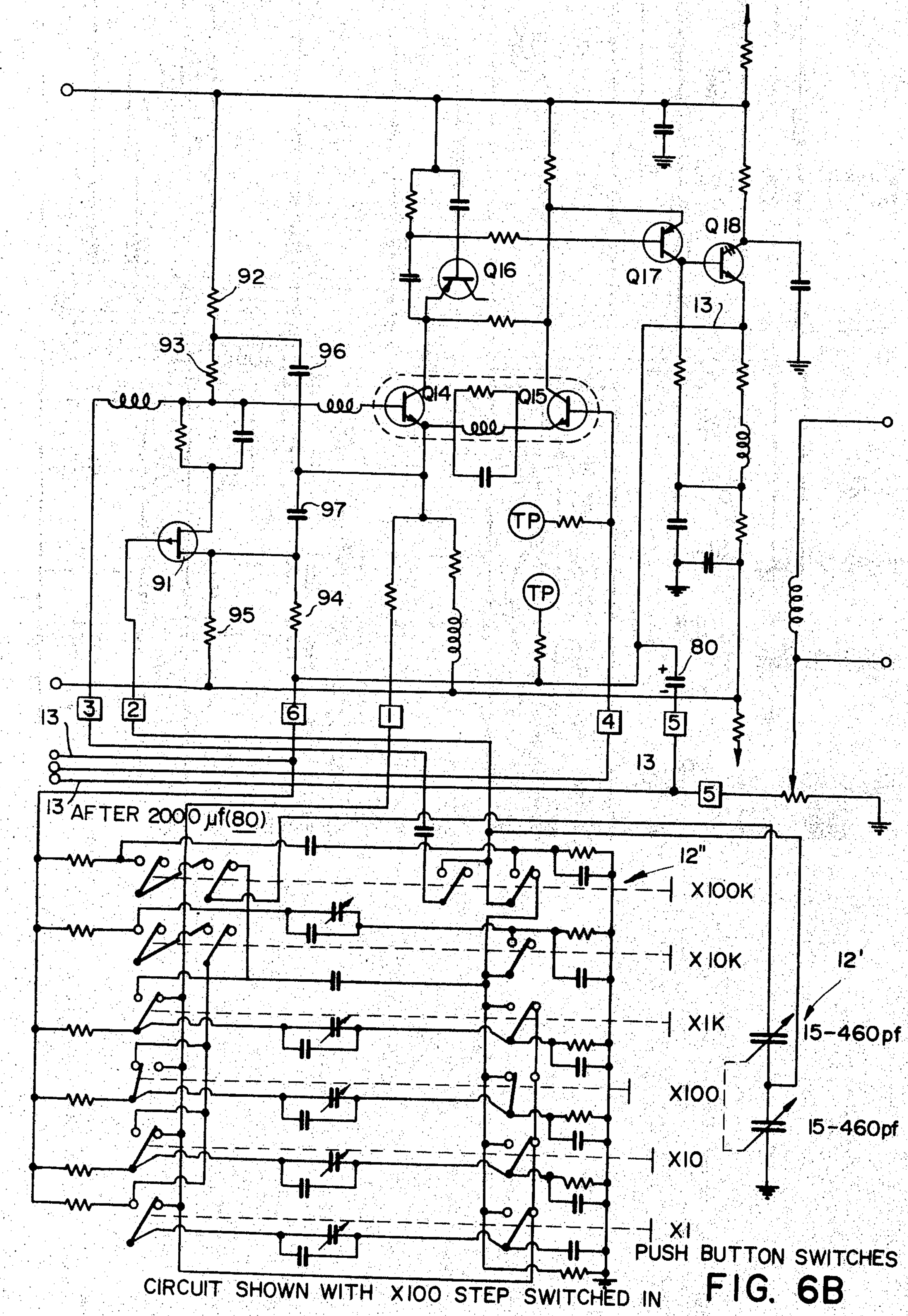

Referring to FIG. 6, there is shown a schematic circuit diagram of a preferred embodiment of the invention of the oscillator, AVC amplifier and the circuitry associated with the AVC FET. Since those skilled in the art will be able to practice the invention by building the circuitry there set forth, the discussion which follows will be limited to setting forth certain aspects of the circuitry helpful in understanding the operation of the novel circuit. FIG. 6 is divided into FIG. 6A and FIG. 6B with the terminals at the right of FIG. 6A the same as correspondingly positioned terminals at the left of FIG. 6B.

FET 91 and transistors Q14, Q15, Q16, Q17 and Q18 comprise the oscillator of FIG. 1. This oscillator is connected to feedback divider resistors 31, 28, 27 and AVC FET 26 and tuning network 12, consisting of a variable air capacitor 12′ for the dial and switched resistors 12″ for band switching, forming a Wien bridge oscillator. Transistors Q14, Q15, Q16 and Q17 form a vanishing gain amplifier generally of the type disclosed in FIG. 4. Q16 functions as the Zener Z1 (base-emitter junction) in FIG. 4. It was used because of the very sharp knee at light operating current and its low cost. The actual circuit in FIG. 6 contains additional components to improve and enhance performance. Also additional stabilizing circuitry is necessary because of the addition of the output emitter follower (Q18) in the loop and the amount of capacitive loading on the output of the loop. Transistors Q14, Q15 and Q17 are equivalent to transistors Q8, Q9 and Q10 respectively, in the circuit of FIG. 4.

The output of the oscillator on line 13 is fed through resistor 71 and diode 72 into an integrator amplifier comprising transistors Q19, Q20, Q21′ and associated circuit components functioning as a direct coupled amplifier. The input to the integrator comprises the positive half sinewave of current transmitted by diode 72 and the minus reference current from Zener diode 73. The output of the integrator amplifier is applied to the gate line 25 of AVC FET 26 which coacts with resistors 27, 28 and 31, as mentioned above, to function as a variable attenuator that maintains the amplitude substantially constant.

The circuitry comprising diodes 81–84 and networks 86 and 89 provides nonlinear high frequency compensation to flatten the frequency response. Diode 85 prevents D-C buildup on the 2000 $\mu$f. coupling capacitor 80 by loading that capacitor on the negative half cycle in substantially the same manner as diode 72 loads on the positive half cycle. The waveform at the junction of diodes 72 and 85 is ideally a square wave. However, at high frequencies, this waveform rounds off, slowing diode conduction and tending to produce a rise in oscillator output amplitude. The variable capacitor in network 89 is adjusted until this rise is essentially zero at the highest frequency of interest.

The closed loop comprising the oscillating circuit, rectifying circuitry, integrator amplifier and the AVC FET coacts to hold the sum of the currents into the integrator substantially zero by controlling the amplitude of the oscillator so that this amplitude remains essentially constant.

To stabilize the AVC so as to avoid oscillations, an instantaneous type of AVC is used to effect a nonlinear gain change, or odd harmonic distortion or damping at the peaks. This technique may be thought of as odd harmonic distortion of the right phase so as to reduce the amplitude of the sine-wave output. The generated distortion changes considerably with small changes in amplitude; hence, it tends to instantaneously dampen any amplitude changes.

The load resistors 92, 93, 94, 95 for the drain and source of FET 91 are bootstrapped to minimize changes in voltage across and current through FET 91. This reduces the amount of distortion generated in FET 91. A resistor divider comprising resistor 94 and 95 and capacitor 97 bootstraps the drain, and the capacitor 96 bootstraps the source.

The output driver transistor Q17 is the second stage of amplification and receives its drive from the collectors of transistors Q14 and Q15 using the bootstrap and stage vanishing circuit described in connection with the circuit of FIG. 4. Transistor Q18 functions as the output emitter follower and receives its drive from the transistor Q17 collector.

Figures 7, 8:
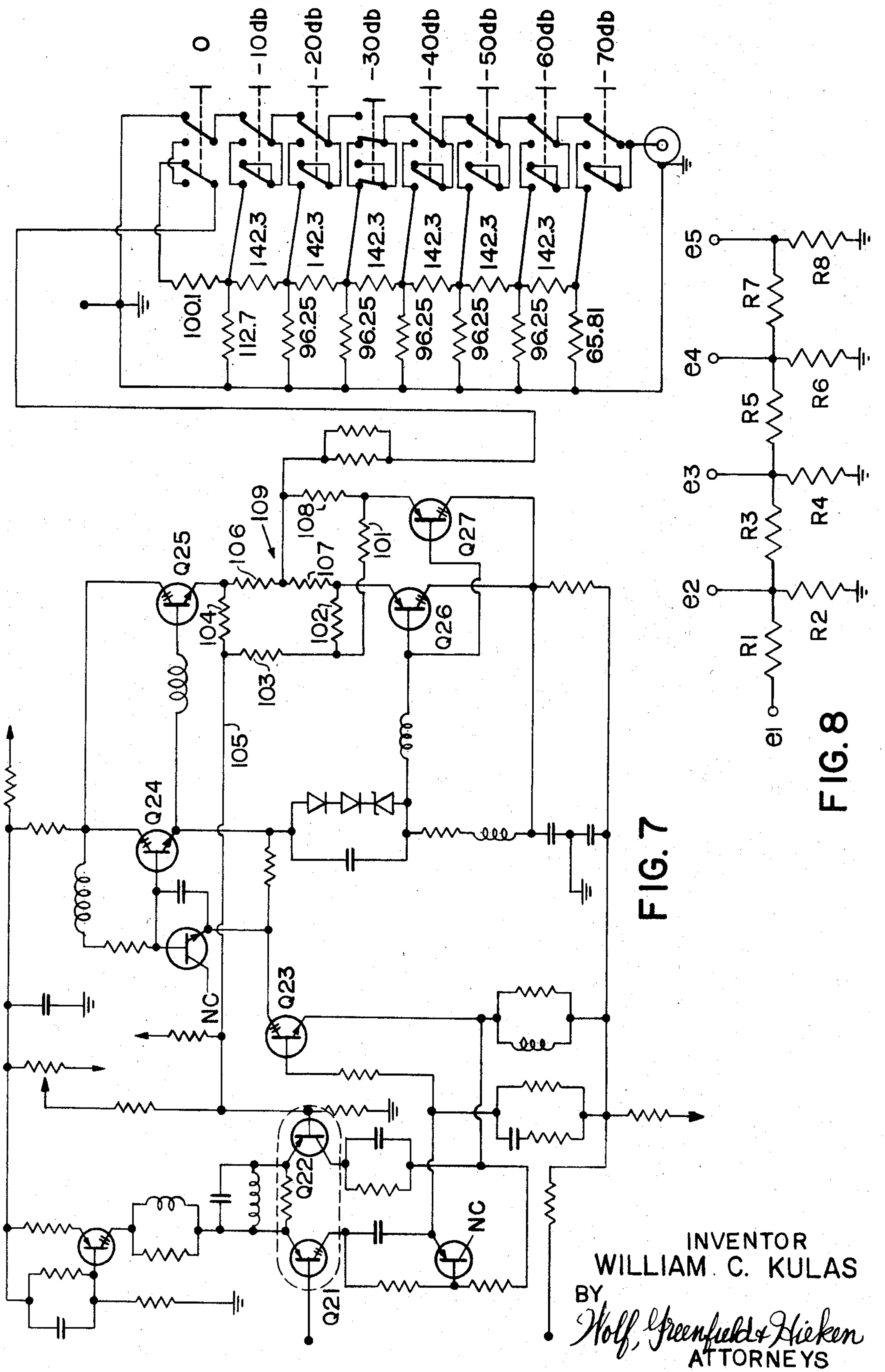
FIG. 7 is a schematic circuit diagram of the output amplifier in an exemplary embodiment.
FIG. 8 is a schematic circuit diagram of a ladder attenuating network helpful in understanding principles of the invention.

Referring to FIG. 7, there is shown a schematic circuit diagram of the output loop functioning as a direct coupled differential amplifier. The terminals at the left of FIG. 7 are the same as correspondingly positioned terminals at the right of FIG. 6B. The first stage comprises a differential pair comprising transistors Q21, Q22 and associated circuitry driving a common emitter second stage comprising transistor Q23 and associated circuitry embodying the bootstrapped collector load and stage vanishing technique circuitry of FIG. 4. Transistor Q23 and associated circuitry comprising the output stage and drive a buffer emitter follower comprising transistor Q24 and associated circuitry using the bootstrapped collector load circuit without stage vanishing that in turn drives a class A push-pull complementary emitter follower output circuit comprising NPN transistor Q25 and a pair of PNP transistors Q26 and Q27 connected in parallel and associated circuit components.

A feature of the invention resides in taking the feedback off the emitters of output transistors Q25, Q26 and Q27 through resistors 101, 102, 103 and 104 to derive a feedback signal on line 105 that is applied to the minus gain base of transistor Q22, the positive gain base of transistor Q21 being the signal input to the output loop. Resistors 106, 107 and 108 then become part of the equivalent output impedance of the loop, this output impedance being the parallel combination of the resistors in series with the output line. If the feedback were derived directly from the output, more costly transistors would be required because power would be wasted in the stabilizing resistors as the circuitry met the call for voltage required to maintain the output potential constant as distinguished from keeping the emitter potentials constant with the circuitry of this invention.

Referring to FIG. 8, there is shown a schematic circuit diagram of a stepped attenuator helpful in understanding the principles of design of an attenuator according to the invention. The attenuator comprises a cascade of two-resistor L sections with their values chosen according to the invention so as to produce both a desired attenuation and present a constant output impedance on each step. The signal may be applied across the full attenuator. The user may then select the desired attenuation by selecting an appropriate tap on the attenuator. The change in gain from step to step need not be the same. However, if the gain per step is constant, the number of values of resistors may be reduced to but five values.

The equations which yield the values of the resistors used will follow:

(Step #1) $A1=e2/e1$
(Step #2) $A2=e3/e2$
(Step #3) $A3=e4/e3$
(Step #4) $A4=e5/e4$ $R1+R2$ are the first step, $R3+R4$ the second, $R5+R6$ the third, etc. This would continue for as many steps as there are.

For general equation

A11=gain of step being computed
A22=gain of following step
Ro=output impedance (constant for all steps).

The value for the first two resistors R1 and R2 in the first step are given by $$R1=Ro/A11 \quad R2=[Ro(A22+1)]/[1-A11-A11A22]$$

For the circuit in FIG. 8

$$Ro/A1 \quad [Ro(A2+1)]/[1-A1-A1A2]$$

The values for the resistors to ground between the first step and the last is given by $$\text{to ground } R=[Ro(A11+1)(A22+1)]/[1-A11A22]$$

for the circuit in FIG. 8;

$$R4=[Ro(A2+1)(A3+1)]/[1-A2A3]$$

$$R6=[Ro(A3+1)(A4+1)]/[1-A3A4]$$

If the gain drop between each step were equal the value for these resistors would be equal.

The value of the last resistor to ground in the last step, in this case R8, is given by:

$$\text{last } R=Ro(A11+1)$$

This is the same as the previous equation with A22 equal to zero.

For the circuit in FIG. 8

$$R8=Ro(A4+1)$$

The value for the resistors between the first and last step is given by:

$$R=Ro[1-A11^2]/A11$$

for the above circuit.

$$R3=Ro[1-A2^2]/A2$$

$$R5=Ro[1-A3^2]/A3$$

$$R7=Ro[1-A4^2]/A4$$

If the gain drop between each step were equal the value for these resistors would be equal.

Referring again to FIG. 7, there is shown an actual commercial embodiment of output attenuator 16. Each step is selected by a double-pole-double-throw push button switch. In the specific example illustrated, the attenuation per step is 10 decibels, and the 30 db step is shown selected. The switches are connected so as to ground all unused switch contacts ahead of the step being used. In this way the switches act as their own shield.

There has been described an exceptionally wideband low distortion relatively high power economical compact signal source characterized by numerous features. In the commercially available Krohn-Hite Model 4200 embodiment of the invention the frequency range is 10 Hz. to 10 mHz., the power output ½ watt, the maximum output 10 volts RMS, the frequency response flat within 0.025 db, the maximum harmonic distortion 0.1%, amplitude stability constant within 0.02%, the frequency accuracy within 2%, the internal impedance 50 ohms, and the bench model fits within a case 8½" wide by 5¼" high by 13⅓" deep weighing but 11 pounds.

It is evident that those skilled in the art may now make numerous uses and modifications of and departures from the specific embodiments described herein without departing from the inventive concepts. Consequently, the invention is to be construed as embracing each and every novel feature and novel combination of features present in or possessed by the apparatus and techniques herein disclosed and limited solely by the spirit and scope of the appended claims.

What is claimed is:

1. Electrical signal amplifying apparatus comprising, amplifying circuit means including at least first and second semiconductor signal amplifying devices,
an input terminal and an output terminal,
means for intercoupling said input terminal, said output terminal and said first and second signal amplifying devices for providing on said output terminal the signal on said input terminal amplified,
said means for intercoupling including means comprising at least one capacitor having an impedance that is substantial in a first frequency range below a first frequency and becomes negligible in a second frequency range above said first frequency for maintaining said first and second amplifying devices in a joint amplifying arrangement over said first frequency range below said first frequency and only one of said devices in amplifying relationship in said second frequency range above said first frequency while the other of said devices then comprises a signal coupling means without amplification between said input nad output terminals even when the impedance of said at least one capacitor is zero to attain a high gain bandwith product for said amplifying circuit means,
means for driving one of said first and second devices by the other and driving circuit means associated with the driving one of said devices for coacting therewith to deliver to the driven one of said devices driving current over said first and second frequency ranges so that the output signal from said amplifying circuit means is the amplified input signal applied to the input of said amplifying circuit means.

2. Electrical signal amplifying apparatus in accordance with claim 1 wherein said semiconductor signal amplifying devices comprise first and second transistors at least one of which comprises said driving device comprising a differential pair and at least a third transistor comprising said driven device having its base coupled to the first transistor collector,
and said means for intercoupling comprise a first collector load resistance coupled to the first transistor collector,
a third collector load resistance coupled to the third transistor collector,
said at least one capacitor comprising a first capacitor coupled across said first collector load resistance for bypassing said first collector load resistance in said second frequency range,
means for coupling said input terminal to the base of one of said first and second transistors,
and means for coupling said output terminal to the third transistor collector.

3. Electrical signal amplifying apparatus in accordance with claim 2 and further comprising,
feedback means for inversely feeding back a signal on said third transistor collector to the second transistor base.

4. Electrical signal amplifying apparatus in accordance with claim 3 wherein said semiconductor signal amplifying devices further comprise a fourth transistor having its emitter coupled to the third transistor emitter and its base coupled to the second transistor collector,
and said means for intercoupling further comprises a second collector load resistance coupled to the second transistor collector,
and a second capacitaor for coupling signals of frequency within said second range from the second transistor collector to the third transistor emitter, intercoupling said second transistor collector and third transistor emitter.

5. Electrical signal amplifying apparatus in accordance with claim 1 wherein said semiconductor signal amplifying devices comprise first, second and third transistors with the collector of the first transistor directly coupled to the base of the third transistor and capacitively coupled to the connected-together emitters of the second and first transistors by said at least one capacitor,
at least one of said first and second transistors comprising said driving device,
said third transistor comprising said driven device,
means for coupling said input terminal to the base of one of said first and second transistors,
and means for coupling said output terminal to the third transistor collector.

6. Electric signal amplifying apparatus in accordance with claim 1 wherein said semiconductor signal amplifying devices comprise first and second transistors at least one of which comprises said driving device comprising a differential pair and at least a third transistor comprising said driven device having its base coupled to the first transistor collector,
and said means for intercoupling further comprises a first collector load resistance coupled to the first transistor collector,
a third collector load resistance coupled to the third transistor collector,
a first capacitor comprising said at least one capacitor coupled between the first transistor collector and the connected-together emitters of the first and second transistors for coupling signals of frequency within said second range from said connected-together emitters to said third transistor base, means for coupling said input terminal to the base of one of said first and second transistors, and means for coupling said output terminal to the third transistor collector.

7. Electrical signal amplifying apparatus in accordance with claim 6 and further comprising, feedback means for inversely feeding back a signal on said third transistor collector to the second transistor base.

8. Electrical signal amplifying apparatus in accordance with claim 1 wherein said semiconductor signal amplifying devices comprise first, second and third transistors with the collector of the second transistor connected to the emitter of the third transistor, at least one of said first and second transistors comprising said driving device, said third transistor comprising said driven device, and said means for intercoupling further comprises a first collector load resistance coupled by a Zener diode to the first transistor collector, a second collector load resistance coupled to the second transistor collector, a third collector load resistance coupled to the third transistor collector, an intercoupling resistance connected between the first and second transistor collectors, and a first capacitor comprising said at least one capacitor coupled across said first collector load resistance for bypassing said first collector load resistance in said second frequency range, means for coupling said input terminal to the base of one of said first and second transistors, and means for coupling said output terminal to the third transistor collector.

9. Electrical signal amplifying apparatus in accordance with claim 8 and further comprising, feedback means for inversely feeding back a signal on said third transistor collector to the second transistor base.

10. Electrical signal amplifying apparatus comprising, amplifying circuit means including first and second transistors with the collector of the first transistor connected to the base of the second transistor, an input terminal, an output terminal, a first collector load resistance coupled to the first transistor collector, a second collector load resistance coupled to the second transistor collector, a first capacitor coupled across said first collector load resistance for bypassing said first collector load resistance in a second frequency range above a first frequency, and a second capacitor coupling said input terminal to the emitter of said second transistor for coupling signals to the latter emitter from said input terminal in said second frequency range.

11. Electrical signal amplifying apparatus in accordance with claim 10 and further comprising a Zener diode connected to the first transistor emitter for maintaining the latter emitter at a predetermined substantially constant potential.

References Cited

UNITED STATES PATENTS

| | | | |
|---|---|---|---|
| 3,319,079 | 5/1967 | Matsumoto -------- | 330—21X |
| 3,407,360 | 10/1968 | Buhr ------------- | 330—31X |

ROY LAKE, Primary Examiner

S. H. GRIMM, Assistant Examiner

U.S. Cl. X.R.

330—18, 30, 31, 151; 331—110, 141; 333—81